United States Patent

[11] 3,588,440

[72] Inventor James H. Morse
 Malibu, Calif.
[21] Appl. No. 836,875
[22] Filed June 26, 1969
[45] Patented June 28, 1971
[73] Assignee Hughes Aircraft Company
 Culver City, Calif.

[54] LASER COMBINATION ENERGY SYSTEM
 6 Claims, 1 Drawing Fig.
[52] U.S. Cl. .................................................. 219/121,
 331/94.5
[51] Int. Cl. ...................................................... B23k 27/00
[50] Field of Search .......................................... 219/121
 (C), 121 (EB), 121 (L); 331/94.5

[56] References Cited
 UNITED STATES PATENTS
3,096,767 7/1963 Gresser et al. ................ 219/121L
3,177,535 4/1965 Hanks .......................... 219/121EB
3,424,890 1/1969 Van Ruyven ................. 219/121L Primary Examiner—J. V. Truhe
Assistant Examiner—Hugh D. Jaeger
Attorneys—James K. Haskell and Allen A. Dicke, Jr.

ABSTRACT: First and second lasers having different characteristics are focused on the same spot so that the different characteristics can be employed on the same spot. For example, a solid-state laser can melt a spot on a workpiece, and a fluid-state laser can maintain the liquid spot. A positioning and feeding table is preferably employed to locate the spot on the workpiece at which the combination of the lasers is active.

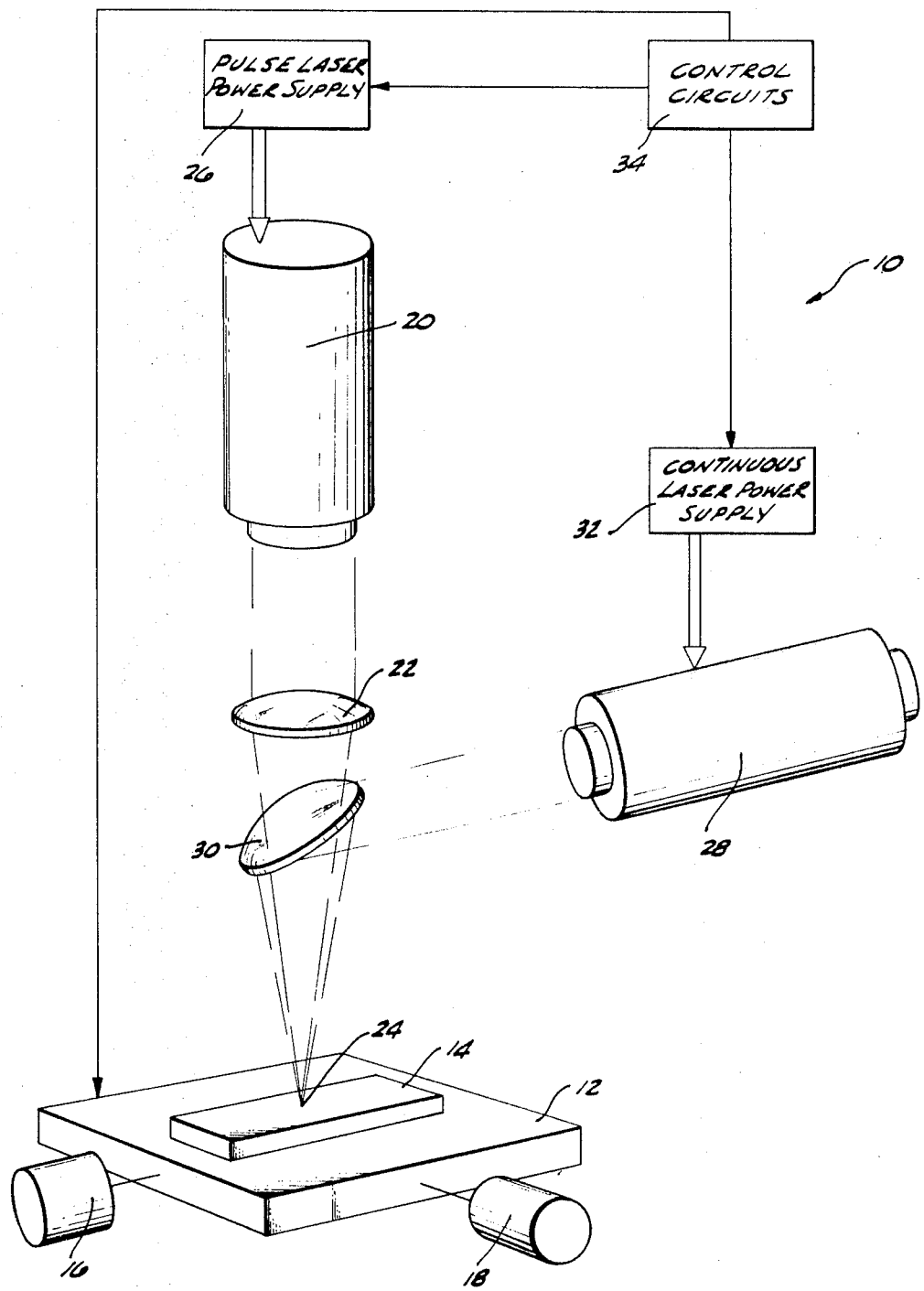

LASER COMBINATION ENERGY SYSTEM

BACKGROUND

This invention is directed to a combination of lasers directed at substantially the same spot so that the different characteristics of the lasers can be employed on the same spot on a workpiece.

Lasers are know in the art. Lasers are described in a number of publications, including "Lasers," by Bela A. Lengyel; Wiley, New York, 1962 and "Introduction to Laser Physics," by Bela A. Lengyel; Wiley, New York 1966, the disclosures of both books being incorporated herein in their entirety by this reference. Pages 52 through 78 of "Lasers" describe solid-state lasers, while pages 79 through 99 of that publication describe fluid-state lasers. It is clear from this description that the characteristics of the lasers differ and one of the major differences is wavelength.

Additionally, lasers are described in the following patents, some of them being directed to solid-state and the others to fluid-state lasers. The entire disclosure of each of these patents is incorporated herein by this reference: W. R. Bennett, Jr. U.S. Pat No. 3,172,057, Mar. 2, 1965; T. H. Maiman U.S. Pat. No. 3,353,115, Nov. 14, 1967; R. C. Vickery et al. U.S. Pat. No. 3,393,372, July 16, 1968; C. Bowness U.S. Pat. No. 3,409,843, Nov. 5, 1968; J. H. Boyden U.S. Pat. No. 3,423,695, Jan. 21, 1969.

This invention is directed to the application of laser energy onto workpieces, and accordingly, workpiece positioning becomes part of the background of the invention. Workpiece positioning can be accomplished by manual techniques, but when operating in the very small distances and tolerances capable of employment of the energy system, positioning and feeding devices become desirable, and preferably become an integral part of the combination. Any convenient positioning and feeding device is satisfactory, whether it be analog or digital. Examples of suitable positioning devices are disclosed in the following patents: T. M. Berry, U.S. Pat. No. 2,679,620, May 25, 1954; W. Shockley U.S. Pat. No. 2,696,565, Dec. 7, 1954; J. W. Forrester et al. U.S. Pat. No. 3,069,608, Dec. 18, 1962. The entire disclosure of each of the above patents is incorporated herein by this reference.

SUMMARY

In order to aid in the understanding of this invention, it can be stated in essentially summary form that it is directed to a laser combination energy system wherein first and second lasers are focused at substantially the same spot on a workpiece, and are separately employed at the same spot to accomplish different, but cooperative results. Preferably a workpiece positioner and/or feeder is employed to position the workpiece with respect to the combined laser energy output.

Accordingly, it is an object of this invention to provide a laser combination energy system wherein first and second lasers direct energy onto substantially the same spot of a workpiece. It is another object to provide first and second lasers of different characteristics, with both the lasers being directed at substantially the same point on a workpiece. It is still another object of this invention to provide a laser-melting system wherein the energy from one laser is employed to produce a molten metal pool, and the energy from another laser is employed to maintain the molten state of the pool. It is still another object of this invention to provide an integrated system providing first and second lasers, with the first laser having characteristics to accomplish a first objective, and with a second laser having characteristics to accomplish a second objective, with the first and second lasers focused at substantially the same points so that the first and second accomplishments can be performed at substantially the same point on a workpiece. Other objects and advantages of this invention will become apparent from a study of the following portion of the specification, the claims and the attached drawing.

BRIEF DESCRIPTION OF THE DRAWING

The single FIGURE of the drawing shows the various components of the laser combination energy system of this invention partly in schematic and partly in perspective interrelationship.

DESCRIPTION

The laser combination energy system is generally indicated at 10 in the drawing. It comprises a table 12 upon which a workpiece 14 is secured. Table 12 is positionable on X and Y coordinates by means of motors 16 and 18 which are provided with suitable signals to position the workpiece 14 where desired, and to feed the workpiece as required. As described above, any workpiece positioning and feeding table of well-known characteristics, such as those in the referenced patents, are suitable for this use.

Solid-state laser 20 is one of the types of solid-state laser described in the above reference books and patents, and is preferably a ruby laser. A laser 20 is focused through lens 22 to a small spot 24 on workpiece 14. The arrangement is such that when laser 20 is actuated, it discharges its energy onto a known spot 24, which is related to the workpiece by means of the positioning of table 12. Power supply 26 furnishes power to and triggers solid-state laser 20. One of the characteristics of the solid-state laser 20 is that its output wavelength is such as to be readily absorbed by workpiece 14. For example, when laser 20 is a ruby laser operating at about 7,000 angstroms, the emitted power is readily absorbed in workpiece 14 when the workpiece is made of any of the common metals in commercial condition. For example, ruby laser output energy is highly absorbed in stainless steel, copper, nickel, aluminum, etc. The workpieces might be wires, sheets and foils. Thus, the discharge of such a solid-state laser into the workpiece 14 will create a pool of molten material at spot 24.

However, laser 20 is an intermittent device, and cannot maintain a discharge to maintain a molten spot to thus provide continuous work on the workpiece. In order to supply the continuity, fluid-state laser 28, which is of continuous discharge capability, is provided. The output of fluid-state laser 28 is focused by dichroic mirror 30 onto spot 24. Mirror 30 is transparent to the emission of solid-state laser 20, but reflects the output of laser 28. Power supply 32 furnishes the power to laser 28. The two lasers are described in considerably more detail in the above-identified publications and patents.

The interrelationship of the parts is such as to provide for laser welding, machining, drilling and other laser-induced material processing. In the present example, the material of workpiece 14 is a metal foil in the order of 0.010 inch thick, and of a material which is oxidizable for cutting or meltable for welding. Iron and aluminum are examples of such metals. Presuming that welding is the step to be performed, the workpiece 14 is placed in a suitable inert atmosphere. In such a case, the entire positioning table 12 may be within the inert atmosphere, but the laser equipment can be outside the inert atmosphere chamber with its beams entering the chamber by way of an appropriate window or windows. The starting point for the weld is established by appropriate positioning of the table, and control circuit 34 is informed of the proper starting position of the table 12. Now, the solid-state laser 30 is energized by the control circuits to direct a pulse of energy onto spot 24 workpiece 14. This pulse is of sufficient energy and the energy is at such wavelength that virtually all of the energy is absorbed into workpiece 14 at spot 24, and is of sufficient energy to cause a spot to be melted at spot 24.

Concurrently with the firing of laser 20, immediately as the molten spot is formed at spot 24, fluid-state laser 28 is energized to direct its energy onto spot 24. Normally the amount of energy output of laser 28 is insufficient to cause a spot to become molten, because at the normal wavelength of fluid-state lasers, most of the energy is reflected from a solid workpiece 14. However, as soon as the liquid spot is formed, most of the energy of fluid-state laser 28 is absorbed, because of the different surface characteristics in the molten spot. Since the input energy into the spot from fluid-state laser 28 is sufficient to maintain fluidity, the control circuits can direct movement of table 24 carrying workpiece 14, in such a path as to cause welding along the desired path. The fluid spot of the material of workpiece 14 then proceeds along the path of travel, so that a weld is accomplished along the desired line.

Such welding can be accomplished automatically, with as frequent restarts as the solid-state laser is capable of performing. Thus, welding on very small parts in an automatic manner can be readily accomplished from a fully programmed control circuit.

It must be appreciated that one of the characteristics of the system which make the combination useful is the fact that the pulse, solid-state laser operating at about 7,000 angstroms produces energy at a wavelength which can be absorbed in the normally finished workpiece of conventional materials. The about 10-micron wavelength of a carbon-dioxide laser, such as would preferably be employed as the fluid-state laser 28, is reflected from a solid workpiece surface. However, as soon as the spot is liquefied on such a surface, the 10-micron wavelength energy from the fluid-state laser is virtually totally absorbed, as compared to substantially reflected. Thus, it is able to maintain the fluid condition of the pool.

When welding is desired, the workpiece is in a suitably inert atmosphere to prevent oxidation. However, when cutting is desired and the workpiece is oxidizable, air or an oxygen-enriched atmosphere may be employed to permit rapid oxidation together with cutting. Such oxidation can thus contour, machine or drill holes, in accordance with the movement of the table 12.

This invention having been described in its preferred embodiment, it is appreciated that it is capable of numerous modifications and embodiments within the ability of those skilled in the art and without the exercise of the inventive faculty.

I claim:

1. An energy system, said energy system comprising the combination of:

first laser means having an energy output at a first frequency suitable for energy absorption into a solid material and being focused on a spot for delivery of laser energy to solid material at the spot;

second laser means having an energy output at a second frequency different from said first frequency suitable for energy absorption into a liquid material and focused on the spot for delivery of laser energy to liquid material at the spot; and control means for controlling said first laser means and said second laser means so that said first laser means melts a spot on a workpiece of solid material and said second laser maintains the melted spot on the workpiece.

2. The energy system of claim 1 wherein said first laser means is a pulse laser and said second laser means is a continuous laser.

3. The energy system of claim 2 wherein said first frequency is such that the majority of the laser output power of said first laser means is absorbed by a solid, metallic workpiece and the second frequency is such that a substantial portion of the laser energy is reflected from a solid, metallic workpiece, and a majority of the energy is absorbed in a molten spot on the workpiece so that said first laser means melts a spot and said second laser means maintains liquidity of the melted spot.

4. The energy system of claim 3 wherein a dichroic mirror is employed so that the energy from one of said laser means passes through said dichroic mirror and the energy of the other of said laser means is reflected by said dichroic mirror so that said first and second laser means can be physically separated and be focused upon the same spot.

5. The process for continuously thermally acting upon a metal, said process comprising the steps of:

pulsing a laser focused onto a metal workpiece at a first frequency that the energy of the laser pulse is substantially absorbed in the workpiece to produce a molten spot in the workpiece; and directing a continuous laser focused onto the spot at a second frequency to maintain the molten condition of the spot by absorption of a substantial portion of the energy from the continuous laser into the spot so that the spot remains molten as long as the continuous laser is directing energy onto the spot.

6. The process of claim 5 including the step of moving the workpiece while the continuous laser maintains a molten spot thereon so that the continuous laser is active to melt a line on the workpiece in accordance with workpiece motion relative to the point of laser energy absorption.